US011914966B2

(12) United States Patent
Goldbraich

(10) Patent No.: US 11,914,966 B2
(45) Date of Patent: Feb. 27, 2024

(54) TECHNIQUES FOR GENERATING A TOPIC MODEL

(71) Applicant: International Business Machines Corporation, Armonk, NY (US)

(72) Inventor: Esther Goldbraich, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 835 days.

(21) Appl. No.: 16/445,256

(22) Filed: Jun. 19, 2019

(65) Prior Publication Data

US 2020/0401663 A1    Dec. 24, 2020

(51) Int. Cl.
*G06F 40/40* (2020.01)
*G06N 20/00* (2019.01)
*G06F 16/28* (2019.01)
*H04L 51/52* (2022.01)

(52) U.S. Cl.
CPC ............ *G06F 40/40* (2020.01); *G06F 16/285* (2019.01); *G06N 20/00* (2019.01); *H04L 51/52* (2022.05)

(58) Field of Classification Search
CPC ....... G06F 40/40; G06F 16/285; G06N 20/00; H04L 51/32
See application file for complete search history.

(56) References Cited

U.S. PATENT DOCUMENTS

| 9,449,096 | B2 * | 9/2016 | Balmin ................. G06F 16/338 |
| 9,633,140 | B2 | 4/2017 | Lai et al. |
| 2008/0115068 | A1 * | 5/2008 | Smith ................. H04L 12/1813 715/758 |
| 2014/0279003 | A1 * | 9/2014 | Grigg ................. G06Q 30/0261 705/14.58 |

(Continued)

FOREIGN PATENT DOCUMENTS

| EP | 3217297 A1 | 9/2017 |
| JP | 2014146218 A | 8/2014 |

(Continued)

OTHER PUBLICATIONS

Author: Selva Prabhakaran, "LDA in Python—How to Grid Search Best Topic Models", published: Apr. 4, 2018, publisher: 'Machine learning plus', pp. 1-57 (Year: 2018).*

(Continued)

*Primary Examiner* — Wilson W Tsui
(74) *Attorney, Agent, or Firm* — Caleb D. Wilkes

(57) ABSTRACT

In some examples, a system for generating a topic model includes a processor that can process a set of documents to generate training data, wherein each document in the set of documents is associated with one or more users. The processor can also generate a plurality of topic models using the training data, such that each topic model includes a different number of topics. The processor can also generate an evaluation score for each of the topic models based on information about the users associated with the documents (Continued)

included in the training data. The evaluation score describes a percentage of topics that exhibit a specified level of interest from a specified number of users. The processor can also identify a final topic model based on the evaluation scores and store the final topic model to be used in natural language processing.

20 Claims, 5 Drawing Sheets

(56) References Cited

U.S. PATENT DOCUMENTS

| | | | |
|---|---|---|---|
| 2016/0180246 A1* | 6/2016 | Vickrey | G06N 20/00 706/12 |
| 2016/0379129 A1* | 12/2016 | Assem Aly Salama | G06Q 30/0282 706/52 |
| 2018/0157639 A1* | 6/2018 | Rangarajan Sridhar | G10L 25/30 |
| 2018/0196796 A1 | 7/2018 | Wu | |
| 2018/0239495 A1 | 8/2018 | Sharifi et al. | |
| 2018/0239822 A1 | 8/2018 | Reshef et al. | |
| 2019/0114298 A1* | 4/2019 | Acharya | G06F 40/20 |
| 2019/0180327 A1* | 6/2019 | Balagopalan | G06F 16/951 |
| 2020/0279019 A1* | 9/2020 | Peterson | G06N 20/00 |

FOREIGN PATENT DOCUMENTS

| | | | | |
|---|---|---|---|---|
| JP | 6079270 B2 | 2/2017 | | |
| JP | 6101028 B2 | 3/2017 | | |
| WO | WO-2013138859 A1 * | 9/2013 | | G06F 17/2785 |

OTHER PUBLICATIONS

Arun, R. et al., "On Finding the Natural Number of Topics with Latent Dirichlet Allocation: Some Observations," Lecture Notes in Computer Science book series, vol. 6118, Jun. 2010, Abstract.

Deveaud, Romain et al., "Accurate and Effective Latent Concept Modeling for Ad Hoc Information Retrieval," Revue des Sciences et Technologies de l'Information—Série Document Numérique, Lavoisier, 2014, pp. 61-84.

Greene et al., "How many topics? Stability analysis for topic models," School of Computer Science & Informatics, University College Dublin, Jun. 19, 2014, 16 pages. < arXiv:1404.4606v3>.

Griffiths, Thomas L. et al., "Finding scientific topics," PNAS, Apr. 6, 2004, vol. 101, pp. 5228-5235. <http://www.pnas.orgcgidoi10.1073pnas.0307752101/>.

Hashavit, Anat et al., "Implicit User Modeling in Multiparticipant Chat," Adjunct Publication of the 26th Conference on User Modeling, Jul. 8, 2018, pp. 275-280, Abstract.

Mimno et al., "Optimizing semantic coherence in topic models," Proceedings of the 2011 Conference on Empirical Methods in Natural Language Processing, Jul. 27-31, 2011, pp. 262-272.

Qiu, Jin et al. "The analysis of QQ group topic based on the LDA," 2016 5th International Conference on Computer Science and Network Technology (ICCSNT), Dec. 2016, pages.

Wallach, Hanna M. et al., "Rethinking LDA: Why Priors Matter," NIPS'09 Proceedings of the 22nd International Conference on Neural Information Processing Systems, Dec. 7-10, 2009, pp. 1973-1981.

Wang, Tingting et al., "On mining latent topics from healthcare chat logs," Journal of Biomedical Informatics vol. 61, Jun. 2016, pp. 247-259.

* cited by examiner

TECHNIQUES FOR GENERATING A TOPIC MODEL

BACKGROUND

The present disclosure relates to techniques for generating a topic model for use in natural language processing.

SUMMARY

According to an embodiment described herein, a system for generating a topic model includes a processor that can process a set of documents to generate training data. Each document in the set of documents is associated with one or more users. The processor can also generate a plurality of topic models using the training data, such that each topic model includes a different number of topics. The processor can also generate an evaluation score for each of the topic models based on information about the users associated with the documents included in the training data. The evaluation score describes a percentage of topics that exhibit a specified level of interest from a specified number of users. The processor can also identify a final topic model based on the evaluation scores and store the final topic model to be used in natural language processing.

In some embodiments, a method of generating a topic model includes processing a set of documents to generate training data and proceeding, starting with an initial number of topics, to generate a topic model from the training data in an iterative manner and calculating a user-referenced criterion for the topic model after each iteration. The number of topics can be incremented for a next iteration until the user-referenced criterion satisfies a threshold. The user-referenced criterion describes a percentage of topics that exhibit a specified level of interest from a specified number of users. The method also includes storing the topic model for use in natural language processing In yet another embodiment, a computer program product for generating a topic model can include a computer readable storage medium having program instructions embodied therewith, wherein the computer readable storage medium is not a transitory signal per se. The program instructions can be executable by a processor to cause the processor to process a set of documents to generate training data, wherein each document in the set of documents is associated with one or more users. Additionally, the program instructions can be executable to cause the processor to generate a plurality of topic models using the training data, wherein each topic model comprises a different number of topics. Furthermore, the program instructions can be executable to cause the processor to generate a user-referenced criterion for each of the plurality of topic models based on information about the users associated with the documents included in the training data, wherein the evaluation score describes a percentage of topics that exhibit a specified level of interest from a specified number of users. The program instructions can be executable to cause the processor to identify a final topic model based on the user-referenced criterion and store the final topic model to be used in natural language processing.

DETAILED DESCRIPTION

Figure 1:
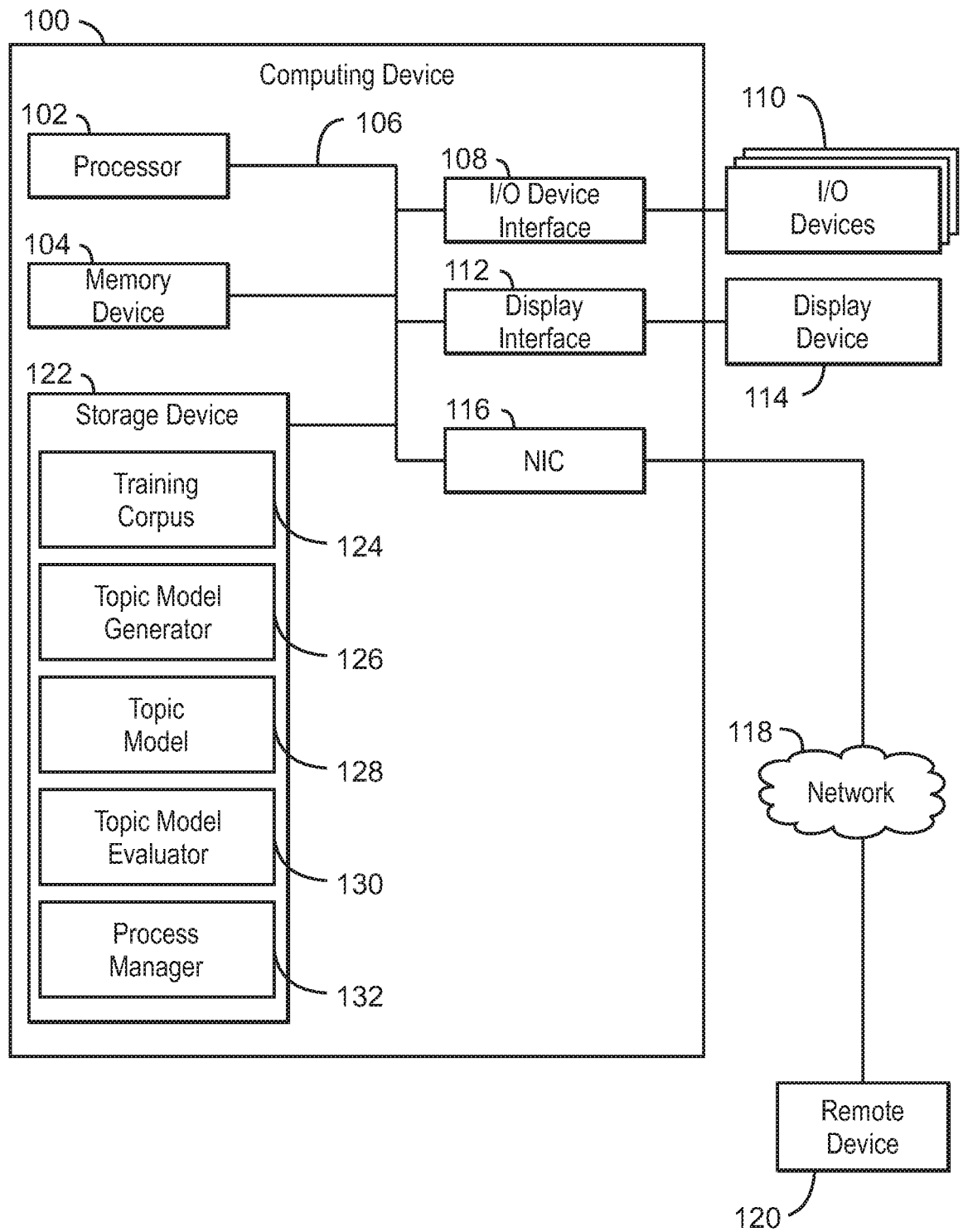
FIG. 1 depicts a block diagram of an example computing system that can generate a topic model according to an embodiment described herein.

Machine learning techniques related to natural language processing can analyze and process natural language data such as terms, e.g., words, phrases, and numbers, occurring in a corpus of documents. Statistical inferences can be used by machine learning techniques to identify heuristic rules from the natural language data. Many natural language processing techniques rely on the use of a topic model that describes a set of abstract concepts that occur within a body of documents. The topic model may be generated by processing a corpus of documents to extract the terms and the frequency with which those terms appear in each document. The data can be processed to group the documents based on the similarity of the terms used in each document, and then group the terms based on the frequency with which certain words appear in similar sets of documents. Each grouping of terms is then associated with a topic of the topic model. Accordingly, each topic of the topic model includes a collection of terms that are considered pertinent to the specific topic. Additionally, each term of each topic may have an associated distribution score. An example of a simplified topic model is shown in Table 1 below. It will be appreciated that an actual topic model will usually include more than two topics and that each topic may be associated with a large number of terms.

TABLE 1

Example Topic model.

| Topics | Term/Distribution Score | |
|---|---|---|
| Topic A | Term 1/0.9 | Term 2/0.1 |
| Topic B | Term 3/0.3 | Term 4/0.7 |

The topic model may then be used to process other documents to statistically determine which topic or set of topics are addressed in the document. To be useful, each topic in the topic model should correspond with an actual field of interest to humans.

The topic model may be generated automatically using an unsupervised machine learning algorithm such as probabilistic latent semantic analysis (PLSA), Latent Dirichlet allocation (LDA), and others. As used herein, the term "automatically" is used to denote an automated process performed by a machine, for example, the computing device 102. It will be appreciated that various processing steps may be performed automatically even if not specifically referred to herein as such. One of the inputs to the topic model generation algorithm is the number of topics to be generated. A challenge encountered in the generation of topic models is the selection of an appropriate number of topics for a given training corpus. With too few topics, distinct fields of interest may be joined into a single topic. With too many topics, a distinct field of interest may be split between separate topics. In either case, the usefulness of the topic model may be compromised.

The present disclosure describes techniques for automatically determining an appropriate number of topics for a topic model using data that describes the persons associated with a document. For example, in a message sending context such as group chat or social media messaging, each message sent through the messaging system can be considered as a separate document. Each message is associated with data about the author of the message. In some cases, the message may be sent to one or more specific recipients or the message text may address or otherwise mention another person. The collection of messages may be used as a training corpus, and the data describing the persons associated with the messages can be used to determine whether the built topic model is appropriate for the given training corpus.

Figure 2:
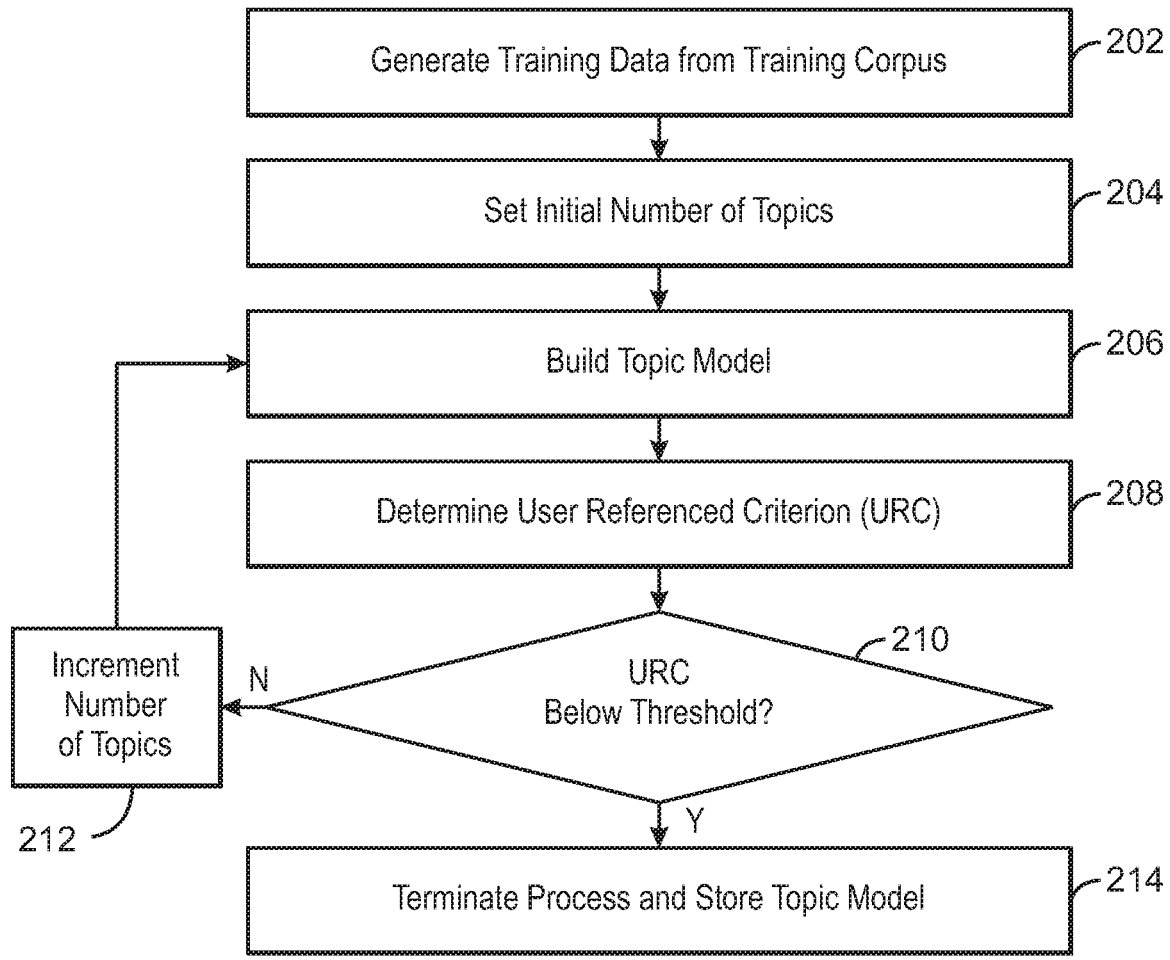
FIG. 2 is a process flow diagram of an example method of generating a topic model according to an embodiment described herein.
Figure 3:
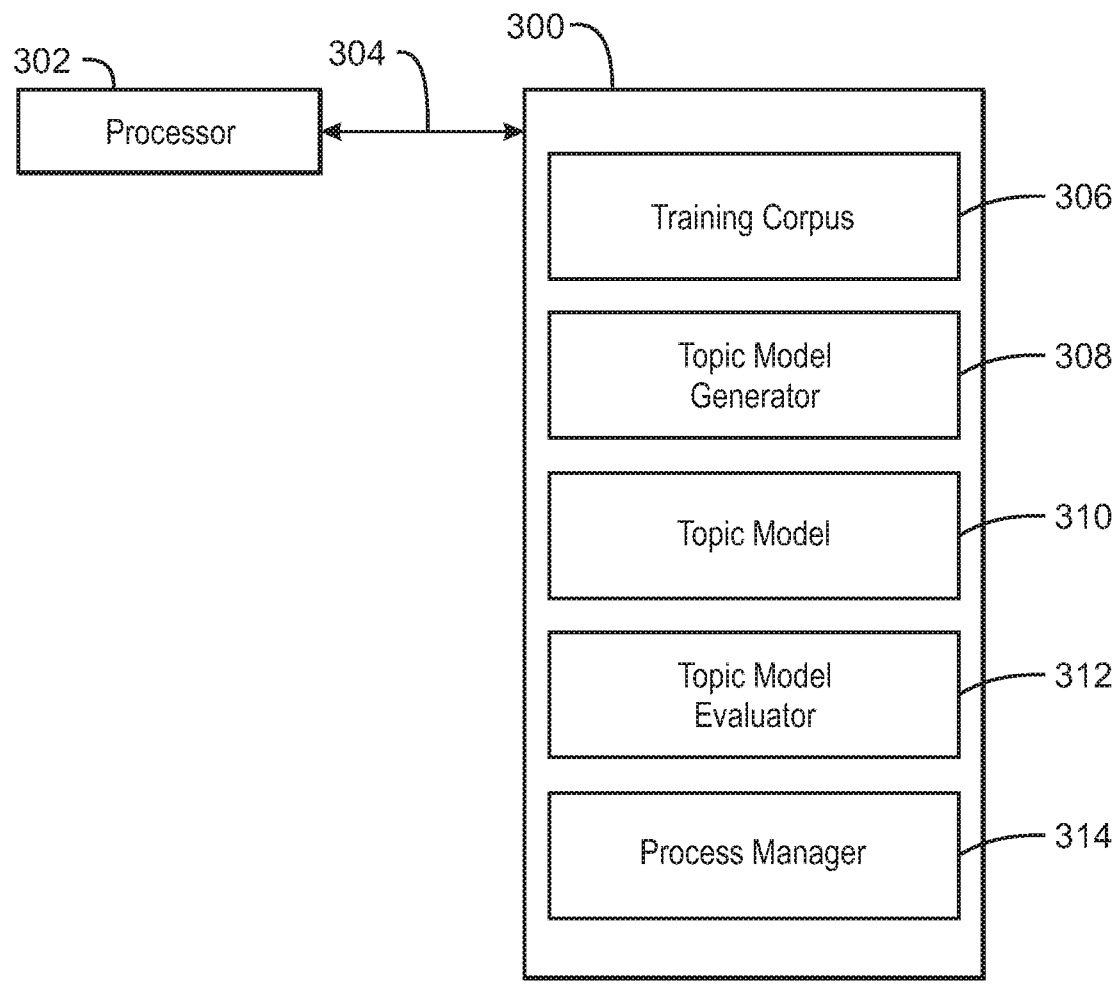
FIG. 3 is a tangible, non-transitory computer-readable medium that can generate a topic model according to an embodiment described herein.

As described more fully with regards to FIGS. 1-3, the process for generating the topic model includes iteratively generating a number of topic models using a different number of topics. After each iteration, an evaluation criterion is computed based on the information about the persons associated with the documents in the training corpus. Once the evaluation criterion satisfies a specified threshold, the process may be terminated and the final topic model may be stored for later use.

With reference now to FIG. 1, an example computing device is depicted that can generate a topic model. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote device 120 may connect to the computing device 100 through the network 118.

In some examples, the processor 102 can be linked through the system interconnect 106 to the storage device 122, which can include a training corpus 124, a topic model generator 126 configured to generate a topic model 128, a topic model evaluator 130, and a process manager 132. The training corpus 124 is the stored set of text documents used to generate the topic model and a set of documents used to evaluate the topic model. The documents used to generate the topic model may be any set of documents that are a collection of terms such as discussions threads in a chat system, an email chain and the like. The documents used to evaluate the generated topic model may be any type of electronic document that includes user generated text and information about the people associated with the document, including group chat messages, emails, Short Message Service (SMS) text messages, social media messages, documents generated by a word processor, and others. People associated with the document can include the author of the user generated text, the sender of a document, recipients of the document, people mentioned in the text, and others. The people associated with the document may be identified in the body of the document or in metadata associated with the document. Information about the people associated with a document may include a person's given name, a user name associated with a social media account, an email address, phone number, or any other information that may be used to identify an individual.

The topic model generator 126 generates a topic model 128 using all or a portion of the documents in training corpus 124. To generate the topic model 128, the documents in the training corpus 124 may be processed to extract the words and phrases associate with each document. Some low-relevance words may be ignored such as articles, pronouns, conjunctions, and the like. Other processing actions may be performed such as joining words to form phrases. Each word and phrase extracted from the training corpus 124 may be referred to as a term. The topic model generator 126 may generate the topic model 128 based on the frequency with which each term occurs in each of the documents. Any suitable technique for generating a topic model may be used, such as probabilistic latent semantic analysis (PLSA), Latent Dirichlet allocation (LDA), and other techniques that may be known or developed. One input to the topic model generator 126 is the number of topics to be generated.

The topic model evaluator 130 receives the topic model 128 generated by the topic model generator 126 and computes an evaluation score for the topic model 128 based on the information about the people associated with the documents used in the training corpus 124. The evaluation score may be referred to as a user-referenced criterion, which is described more fully in relation to FIG. 2. To compute the user-referenced criterion, each topic may be evaluated to determine the level of user interest for each topic. Those topics that exceed a threshold level of interest are identified as "user-referenced." The user-referenced criterion may then be computed based on the percentage of user-referenced topics over the total number of topics. The user-referenced criterion may then be compared to a specified threshold to determine whether topic model 128 is sufficient. If the topic model 128 does not meet the threshold, the number of topics is changed and a new topic model is generated and evaluated using the training data. If the topic model 128 is sufficient, the process terminates and the most recent topic model may be stored for later use.

The process manager 130 controls the process for generating the final topic model by performing the iterative process described above using the training corpus 124, the topic model generator 126, and the topic model evaluator 130. For example, the process manager 130 may initiate the processing of the training corpus to generate the training data, initiate the generation and evaluation of the topic models, and terminate the process once the current topic model satisfies the evaluation score threshold. A process for generating the topic model is described in more detail in relation to FIG. 2.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the topic model generator 126 and the topic model evaluator 128 are partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the topic model generator 126 and the topic model evaluator 128 are implemented with logic, wherein the logic, as referred to herein, can include any suitable hardware (e.g., a processor, among others), software (e.g., an application, among others), firmware, or any suitable combination of hardware, software, and firmware.

FIG. 2 is a process flow diagram of an example method of generating a topic model. The method 200 can be implemented with any suitable computing device, such as the computing device 100 of FIG. 1.

At block 202, the training corpus is processed to generate training data. Generating the training data may include extract the terms associate with each document and determining the frequency with which each term appears in each document. In some embodiments, the resulting training data may include a term vector for each document, wherein each dimension of the vector is associated with a specific term and its value is the number of times that the term appears in the document.

At block 204, the number of topics is set to an initial value. The initial number of topics may be specified by an administrator and may be specified based on consideration of the size of the training corpus. For example, the initial number of topics may be 5, 10, 15 or more.

At block 206, the topic model is built using the training data and using the set number of topics. For the first iteration, the set number of topics will be the number of topics set at block 204. As explained above in relation to FIG. 1, any suitable technique for generating the topic model may be used, such as PLSA, LDA, and others. Once generated, each topic of the topic model will be associated with a term distribution. The term distribution may be a list of terms and a corresponding weight associated to the term.

At block 208, the user-referenced criterion (URC) is computed for the topic model. As explained above, the user-referenced criterion is an evaluation score used to determine whether the topic model is suitable for representing the training corpus. To compute the URC, each topic may be evaluated to determine a level of user interest for each topic. The level of user interest for each topic can be determined by calculating a user topic distribution for each user based on the topic model and the messages associated with that user. The user topic distribution describes the relative interest that a user has exhibited for each topic of the topic model based on the term frequency of the terms appearing in the user's documents that correspond with a specific topic. The level of interest may be expressed as a percentage or a ratio from 0 to 1, wherein a higher value indicates a higher level of interest. Various formulas may be used to calculate the user's level of interest for each topic.

Each of the user topic distributions may be used to determine if a topic has a threshold level of interest among all of the users. For example, a topic may be referred to as "user-referenced" if a threshold number of users (e.g., two users) are interested in the topic. A user may be said to be interested in the topic if the user's level of interest from the user topic distribution for that user exceeds a threshold level (e.g., greater than 10% or 0.1). In this way, the user topic distributions can be used to determine whether each topic is user-referenced. The user-referenced criterion may then be computed as the number of user-referenced topics divided by the total number of topics.

At block 210, the URC is compared to a threshold. The fewer topics there are in the topic model, the more topics can be expected to be user-referenced. As the number of topics is increased, it can be expected that the percentage of user-referenced topics will decrease. Accordingly, the URC will be considered to meet the threshold when the URC is less than or equal to the threshold. The threshold may be specified by the administrator. In some embodiments, the threshold may be a value between 60 percent and 80 percent. In an embodiment, the threshold is 70 percent. If the URC is above the threshold, the process flow advances to block 212.

At block 212, the number of topics is increased. Increasing the number of topics may include incrementing the number of topics by a pre-specified step size. The step size may be any suitable value and may be specified by the administrator. For example, the step size may be 1, 2, 5, 10, or more. In some embodiments, the step size may be dynamic and vary from iteration to iteration. For example, the size may be computed or selected based on the URC and/or how close the URC is to the threshold. After setting the new number of topic models, the process flow returns to block 206. At block 206, a new topic model is generated using the same training data generated at block 202, but using the new number of topics. The process then continues as described above.

At block 210, if the URC is below the threshold, the process advances to block 214, and the process terminates. The topic model generated in the most recent iteration of the process 200 is the final topic model and is stored for future use. The generated topic model may be used to identify the topics associated with other documents and/or other users. Identification of such topics may be used for a wide range of purposes regarding natural language processing. For example, the topic model may be used to identify topics that are of interest to users. The topics of interest to a particular user may be added to a user profile, for example. Such a user profile may be used to deliver targeted advertising, product suggestions, media suggestions, and the like. In some examples, the topic model may be used in a group chat domain to identify messages that may be of more interest to a specific user. Those messages identified as being more relevant to a user's interests may be placed in a more prominent position compared to other messages.

The process flow diagram of FIG. 2 is not intended to indicate that the operations of the method 200 are to be executed in any particular order, or that all of the operations of the method 200 are to be included in every case. Additionally, the method 200 can include additional operations. Addition variations on the above method 200 may be made within the scope of the described subject matter. For example, in the embodiment described in relation to FIG. 2, the number of topics used to generate the initial topic model is small and the number of topics is increased by a specified amount after each iteration. The process is then terminated when the user-referenced criterion is below the specified threshold. However, in some embodiments, the number of topics used to generate the initial topic model may be large and the number of topics may be reduced by a specified amount after each iteration. The process may then be terminated when the user-referenced criterion is above a specified threshold.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 3, a block diagram is depicted of an example of a tangible, non-transitory computer-readable medium that can execute instructions comprising numerical representations with natural language processing techniques. The tangible, non-transitory, computer-readable medium 300 may be accessed by a processor 302 over a computer interconnect 304.

Furthermore, the tangible, non-transitory, computer-readable medium 300 may include data and code to direct the processor 302 to perform the operations of the described techniques. For example, the training corpus 306 is the stored set of text documents used to generate the topic model. Topic model generator 308 generates the topic model 310 using all or a portion of the documents in training corpus 306. The topic model evaluator 312 receives the topic model 310 generated by the topic model generator 308 and computes an evaluation score for the topic model 310 based on the information about the people associated with the documents used from the training corpus 306. The process manager 314 controls the process for generating the final topic model by performing an iterative process that includes generating topic models 310, evaluating the topic models 310 to determine if they satisfy the evaluation score threshold, incrementing or decrementing the number of topics to be included in the next topic model depending on the evaluation results, and terminating the process when the topic model satisfies the evaluation score threshold.

It is to be understood that any number of additional software components not shown in FIG. 3 may be included within the tangible, non-transitory, computer-readable medium 300, depending on the specific application. Furthermore, fewer software components than those shown in FIG. 3 can be included in the tangible, non-transitory, computer-readable medium 300.

Figure 4:
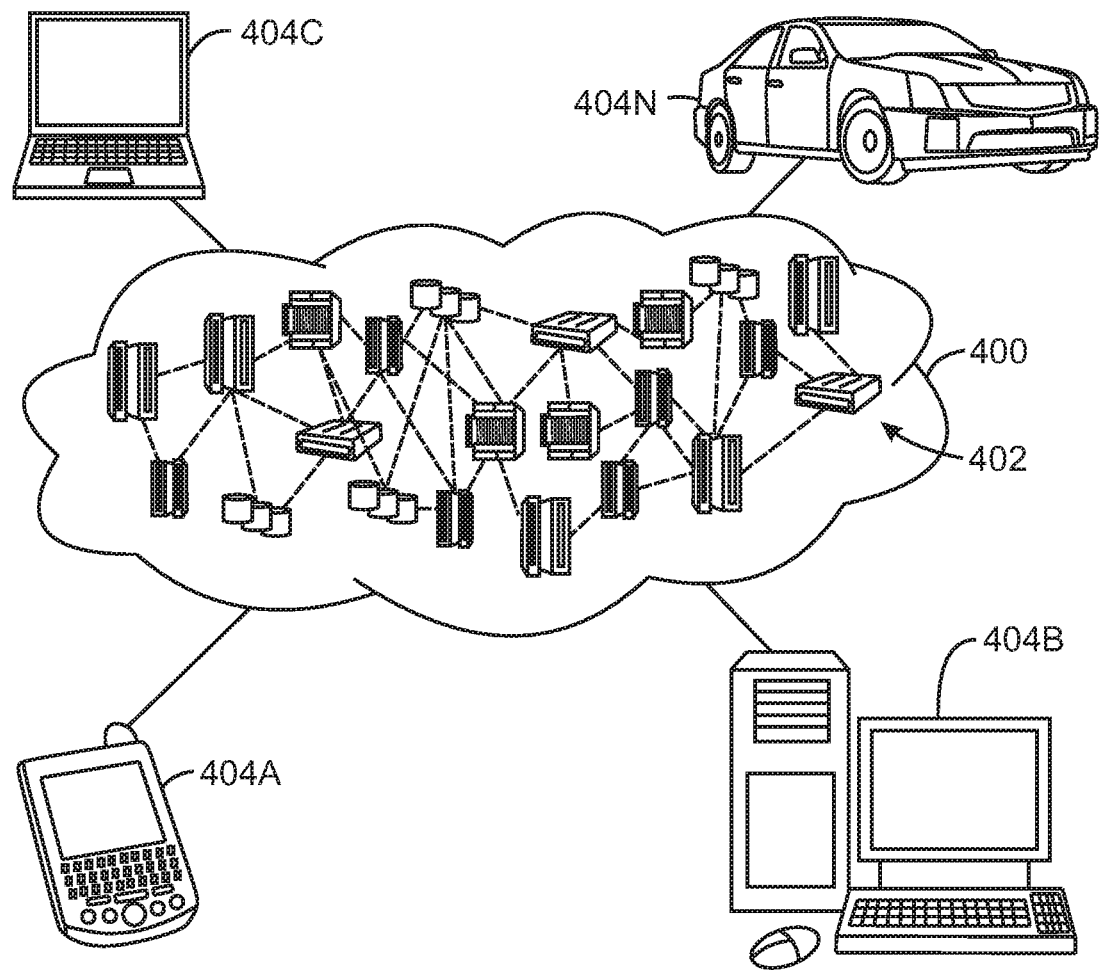
FIG. 4 depicts an illustrative cloud computing environment according to an embodiment described herein.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
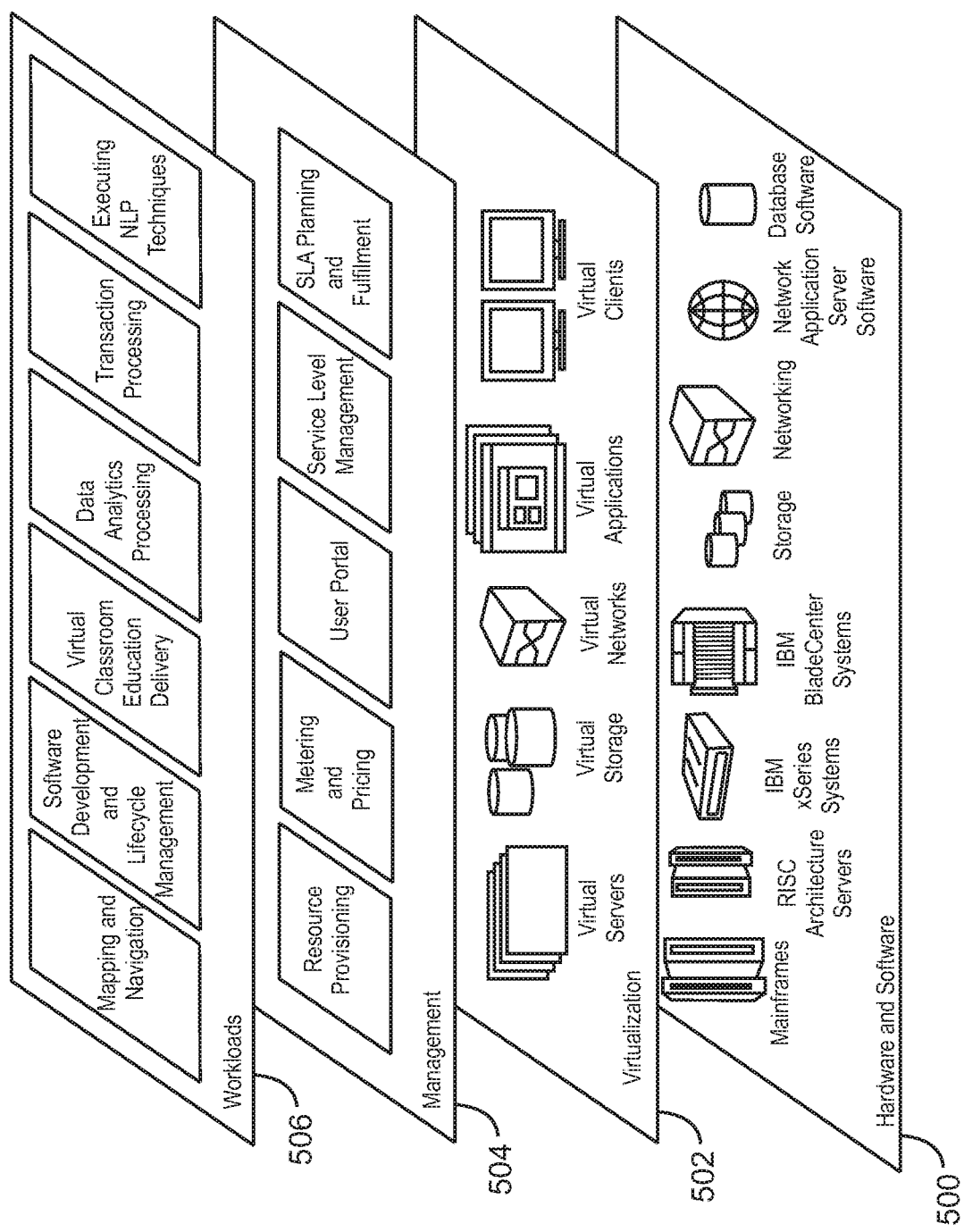
FIG. 5 depicts a set of functional abstraction layers provided by a cloud computing environment according to an embodiment described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and executing natural language processing (NLP) techniques.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for generating a topic model comprising:
one or more processors, one or more computer-readable memories, and program instructions stored on at least one of the one or more computer-readable memories for execution by at least one of the one or more processors to cause the system to:
process a set of documents to generate training data, wherein each document in the set of documents is associated with one or more users and one or more terms are identified from each of the documents based at least upon occurrence frequency;
perform an iterative topic model generation routine for a plurality of iterations, each of the iterations generating another topic model, the performing comprising:
including an initial number of topics in a first topic model in a first initial iteration of the plurality of iterations,
evaluating in each of the plurality of iterations, each specific topic of the topics of the particular topic model to determine when the specific topic is classified as user referenced,
wherein determining whether the specific topic is user referenced comprises calculating for each specific user of the one or more users a topic distribution value that is based on the frequency of the terms appearing in the specific user's associated documents that correspond to the specific topic, and the topic distribution values for the one or more users are collectively compared to a first threshold to identify whether the specific topic is classified as user referenced or not,
evaluating in each of the plurality of iterations a user-referenced criterion for a current topic model, the user-referenced criterion comprising an evaluation score comprising a number of the classified user referenced topics in the current topic model divided by a total number of topics in the current topic model, and
checking whether the user-referenced criterion is identified to not satisfy a second threshold and terminating the iterative topic model generation routine, otherwise, when the user-referenced criterion of the current topic model satisfies the second threshold, modifying the particular topic model by adding a prespecified step size amount of topics to the included topics within the particular topic model to generate another topic model and repeating the evaluation and checking steps in the iterative topic model generation routine; and
upon termination, identifying the particular topic model that was most recently generated as the final topic model and store the final topic model to be used in natural language processing.

2. The system of claim 1, wherein the first threshold comprises two users.

3. The system of claim 1, wherein the topic distribution values are compared to a user level of interest threshold.

4. The system of claim 3, wherein the user level of interest threshold comprises 10 percent.

5. The system of claim 1, wherein the checking whether the user-referenced criterion does not satisfy the second threshold comprises checking whether the user-referenced criterion exceeds the second threshold.

6. The system of claim 1, wherein the second threshold is 70 percent.

7. The system of claim 1, wherein the set of documents comprises a message delivered in a group chat system.

8. The system of claim 1, wherein a first user of the one or more users is identified as associated with one of the documents in the set of documents if the first user sent a message or was mentioned in a message.

9. A method for generating a topic model for use in natural language processing, the method comprising:
processing, via a processor, a set of documents to generate training data, wherein each document in the set of documents is associated with one or more users and one or more terms are identified from each of the documents based at least upon occurrence frequency;
performing an iterative topic model generation routine for a plurality of iterations, each of the iterations generating another topic model, the performing comprising:
including an initial number of topics in a first topic model in a first initial iteration of the plurality of iterations,
evaluating in each of the plurality of iterations, each specific topic of the topics of the particular topic model to determine when the specific topic is classified as user referenced,
wherein determining whether the specific topic is user referenced comprises calculating for each specific user of the one or more users a topic distribution value that is based on the frequency of the terms appearing in the specific user's associated documents that correspond to the specific topic, and the topic distribution values for the one or more users are collectively compared to a first threshold to identify whether the specific topic is classified as user referenced or not,
evaluating in each of the plurality of iterations a user-referenced criterion for a current topic model, the user-referenced criterion comprising an evaluation score comprising a number of the classified user referenced topics in the current topic model divided by a total number of topics in the current topic model, and
checking whether the user-referenced criterion is identified to not satisfy a second threshold and terminating the iterative topic model generation routine, otherwise, when the user-referenced criterion of the current topic model satisfies the second threshold, modifying the particular topic model by adding a prespecified step size amount of topics to the included topics within the particular topic model to generate another topic model and repeating the evaluation and checking steps in the iterative topic model generation routine; and
upon termination, identifying the particular topic model that was most recently generated as the final topic model and store the final topic model to be used in natural language processing.

10. The method of claim 9, wherein the first threshold comprises two users.

11. The method of claim 9, wherein the topic distribution values are compared to a user level of interest threshold.

12. The method of claim 11, wherein the user level of interest threshold comprises 10 percent.

13. The method of claim 9, wherein the checking whether the user-referenced criterion does not satisfy the second threshold comprises checking whether the user-referenced criterion exceeds the second threshold.

14. The method of claim 9, wherein the second threshold is 70 percent.

15. The method of claim 9, wherein the set of documents comprises a message delivered in a group chat system.

16. The method of claim 9, wherein a first user of the one or more users is identified as associated with one of the documents in the set of documents if the first user sent a message or was mentioned in a message.

17. A computer program product for executing natural language processing techniques comprising a computer-readable storage medium having program instructions embodied therewith, and wherein the program instructions are executable by a processor to cause the processor to:

process a set of documents to generate training data, wherein each document in the set of documents is associated with one or more users and one or more terms are identified from each of the documents based at least upon occurrence frequency;

perform an iterative topic model generation routine for a plurality of iterations, each of the iterations generating another topic model, the performing comprising:

including an initial number of topics in a first topic model in a first initial iteration of the plurality of iterations, evaluating in each of the plurality of iterations, each specific topic of the topics of the particular topic model to determine when the specific topic is classified as user referenced, wherein determining whether the specific topic is user referenced comprises calculating for each specific user of the one or more users a topic distribution value that is based on the frequency of the terms appearing in the specific user's associated documents that correspond to the specific topic, and the topic distribution values for the one or more users are collectively compared to a first threshold to identify whether the specific topic is classified as user referenced or not, evaluating in each of the plurality of iterations a user-referenced criterion for a current topic model, the user-referenced criterion comprising an evaluation score comprising a number of the classified user referenced topics in the current topic model divided by a total number of topics in the current topic model, and checking whether the user-referenced criterion is identified to not satisfy a second threshold and terminating the iterative topic model generation routine, otherwise, when the user-referenced criterion of the current topic model satisfies the second threshold, modifying the particular topic model by adding a prespecified step size amount of topics to the included topics within the particular topic model to generate another topic model and repeating the evaluation and checking steps in the iterative topic model generation routine; and upon termination, identifying the particular topic model that was most recently generated as the final topic model and store the final topic model to be used in natural language processing.

18. The computer program product of claim 17, wherein the checking whether the user-referenced criterion does not satisfy the second threshold comprises checking whether the user-referenced criterion exceeds the second threshold.

19. The computer program product of claim 17, wherein the set of documents comprises a message delivered in a group chat system.

20. The computer program product of claim 17, wherein a first user of the one or more users is identified as associated with one of the documents in the set of documents if the first user sent a message or was mentioned in a message.

* * * * *